UNITED STATES PATENT OFFICE.

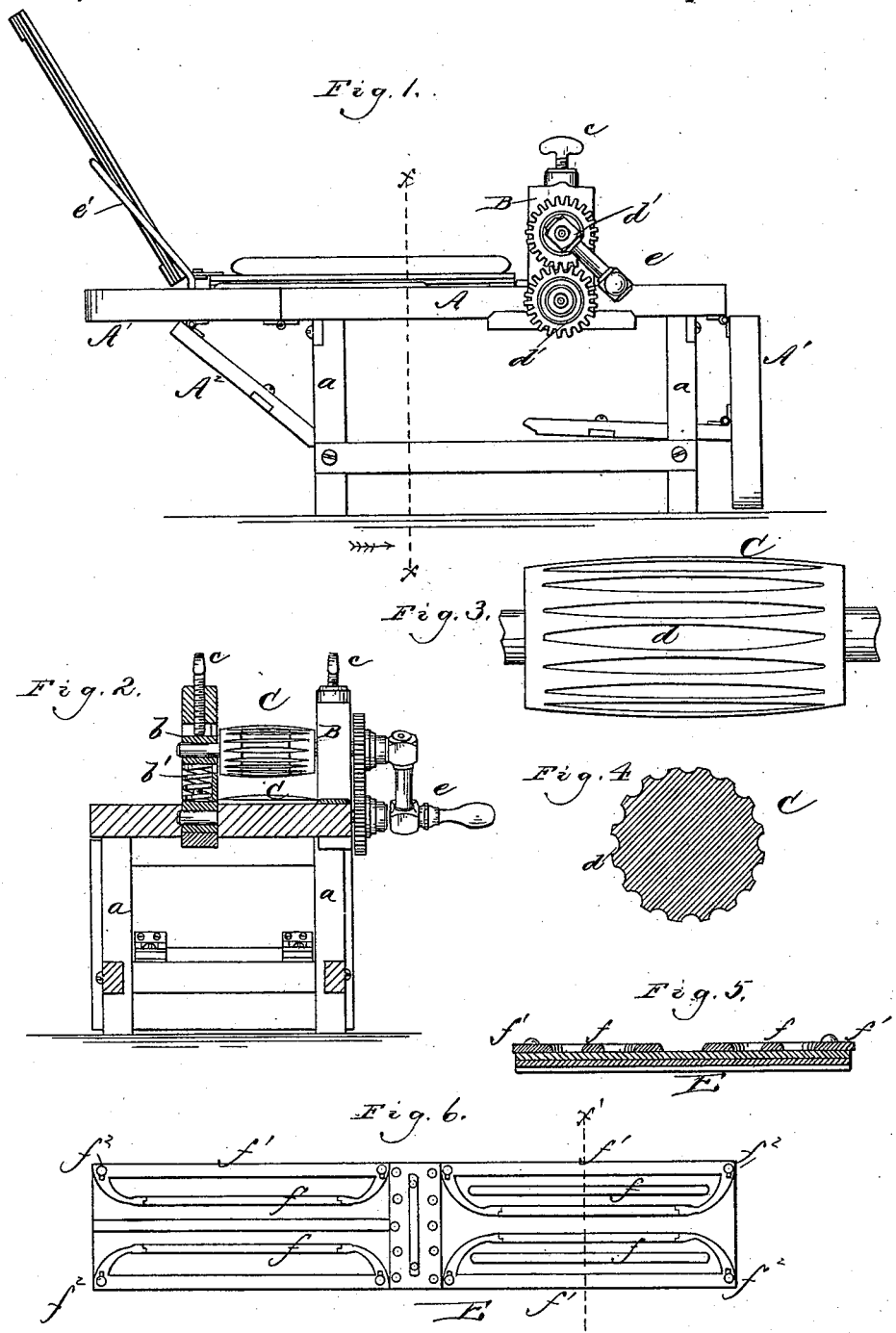

WILLIAM F. SHAFFER, OF CEDAR RAPIDS, IOWA.

OIL-CAKE FORMER AND SPRING-MAT.

SPECIFICATION forming part of Letters Patent No. 275,278, dated April 3, 1883.

Application filed November 27, 1882. (No model.)

*To all whom it may concern:*

Be it known that I, WILLIAM F. SHAFFER, a citizen of the United States of America, residing at Cedar Rapids, in the county of Linn and State of Iowa, have invented an Improvement in Oil-Cake Formers and Spring-Mats, of which the following is a specification, to wit:

This invention relates to improvements in devices for forming "cakes" for oil-presses; and it consists in a suitable frame or stand provided with adjustable fluted rollers, between which the cake is passed to form or spread it evenly, substantially as hereinafter more fully described.

In order to enable others skilled in the art to which my invention belongs to make and use the same, I will now proceed to describe its construction and operation, referring to the accompanying drawings, in which—

Figure 1 is a side elevation of my invention. Fig. 2 is a cross-section of the same. Fig. 3 is a side elevation of one of the fluted rollers. Fig. 4 is a cross-section of the same, and Figs. 5 and 6 are respectively cross-section and plan views of the mat or holder between which the cake is pressed.

A represents a frame or table, provided at each end with a leaf, A', which is supported by hinged arms $A^2$, having notches in their lower ends, by which they are engaged with one of the cross-bars of the supporting-legs $a$ when the leaf is raised, and which rest upon said bar beneath the table when the leaf is lowered.

Upon the table A are two upright posts, B, in vertical slots in which are fitted the sliding journal-boxes $b\ b$, in which are journaled two fluted rollers, C C. Between the upper and lower boxes, $b\ b$, are arranged coiled springs $b'\ b'$, upon which the upper box rests, and which tend to keep the boxes and their respective rollers separated.

$c\ c$ are thumb-screws in the tops of the posts B B, the lower ends of which bear upon the upper journal-boxes and regulate the distance between the rollers.

The rollers C C are preferably formed, as shown, with fluted surfaces, and are larger at the center than at either end, by means of which the edges of the grooves $d\ d$ in the fluted faces of the rollers grasp the cake and force or draw it through the device, while the greater distance between the outer ends of the rollers allows the seed or other matter contained in the cake to be pressed out toward the edges, and thus form a flat and even cake. The journals of the rollers C C pass through the boxes $b\ b$ upon one end, and have intermeshing spur-wheels $d'\ d'$ on their ends, and one of them is also provided with a crank or handle, $e$, by which it is operated.

The seed or other material to be pressed is placed in a bag, E, of some textile fabric, and when placed in the former is naturally much thicker in the middle than at the ends. The grooves in the rollers grasp the bag and draw it through the device, while the pressure in the center, where the rollers are enlarged, being greater than at their reduced ends, presses the surplus bulk of material out toward the edges of the bag, forming a cake of flat and even thickness much better and faster than can be done by hand, as is usual.

One of the leaves A' is provided with a light wire frame, $e'$, for the support of one leaf of the mat E, as shown in Fig. 1.

E represents the mat in which the cake is placed for pressing. It is formed of two leaves, hinged together at one end. These leaves are formed of iron, steel, brass, or copper, and may be supplied with longitudinal ribs $f\ f$, if desired, to aid in expressing the oil. The edges of this mat E are provided on their inner sides with spring-bars $f'\ f'$, which are formed with transverse slots, through which passes a nut, $f^2$, loosely securing the bars to the mat. These bars project slightly beyond the edges of the mat, to abut against the sides of the press-box and protect the bag in which the cake is formed from being cut or injured during the process of pressing, and their outer sides are provided with vertical grooves, or finely corrugated, as seen in Fig. 6, in order that there may be no obstruction to the free downward flow of the oil. The back of the mat is covered by rubber or other flexible material. This mat is opened and placed upon the table A, with one leaf resting upon the frame $e$, in such a manner that as the cake passes from between the rollers C C it will be placed in proper place on the mat. The mat is then closed and placed in a press. Two of them are usually placed in each division of the press, and the spring-bars $f'$, being slotted, give with any inequalities in the press-box, but spring out again and effectually protect the oil-cake from injury.

Such a device as herein described is exceedingly useful, forming the cakes better and faster than it can be done by hand, and does not require an expert pressman or cake-molder to work it, and the mat described is an excellent one for expressing the oil and a complete protection for the cake-bag. The drawings show the former operated by a crank-handle; but in practice it is thought desirable to operate it by a spur-wheel on a shaft beneath the table meshing with one of the spur-gears on the forming-rollers.

Having thus fully described my invention, what I claim as new, and desire to secure by Letters Patent, is—

1. In an oil-cake former, a pair of adjustable fluted or corrugated rollers, made somewhat smaller at their ends than in their center, substantially as and for the purpose set forth.

2. A mat for oil-presses provided along its edges with projecting spring-bars for protecting the cake cover from injury during the operation of pressing, substantially as described and shown.

3. In an oil-cake mat, the spring-bars $f'\ f'$, provided with slots $f^2$, through which they are riveted to the mat, and having corrugated outer edges, substantially as shown and described.

4. The combination, in a mat for use in oil-presses, of the mat E, covered with rubber or other flexible material, and formed with bars or ribs $f\ f$, with the slotted projecting spring-bars $f'\ f'$, having corrugated outer faces, substantially as and for the purpose set forth.

In testimony whereof I affix my signature in presence of two witnesses.

WILLIAM F. SHAFFER.

Witnesses:
A. D. MILLER,
HENRY ALBERT.